United States Patent [19]

Koyama et al.

[11] Patent Number: 5,542,557
[45] Date of Patent: Aug. 6, 1996

[54] CONTAINER CLOSURE WTH LINER AND METHOD OF PRODUCING THE SAME

[75] Inventors: Masayasu Koyama, Zushi; Yasuhiro Oda, Yokohama; Hiroaki Kikuchi, Hiratsuka; Muneki Yamada, Fujisawa, all of Japan

[73] Assignee: Toyo Seikan Kaisha, Ltd., Tokyo, Japan

[21] Appl. No.: 288,201

[22] Filed: Aug. 9, 1994

Related U.S. Application Data

[62] Division of Ser. No. 879,351, May 7, 1992, Pat. No. 5,381,914.

[30] Foreign Application Priority Data

May 9, 1991 [JP] Japan ................... 3-104536

[51] Int. Cl.$^6$ ............................... B65D 53/04
[52] U.S. Cl. .................. 215/347; 206/7; 220/378
[58] Field of Search ............ 206/0.7; 215/348, 215/350, 341, 228, 347; 426/118, 124; 220/378

[56] References Cited

U.S. PATENT DOCUMENTS

| | | | |
|---|---|---|---|
| 4,111,323 | 9/1978 | Ichmose et al. | 215/347 X |
| 4,287,995 | 9/1981 | Moriya | 215/228 |
| 4,372,457 | 2/1983 | Kunumoto et al. | 215/228 |
| 4,536,409 | 8/1985 | Farrell et al. | 426/398 |
| 4,702,966 | 10/1987 | Farrell et al. | 428/500 |
| 4,740,402 | 4/1988 | Maeda et al. | 428/500 X |
| 4,785,952 | 11/1988 | Obadia | 215/350 X |
| 5,089,323 | 2/1992 | Nakae et al. | 428/220 |
| 5,143,763 | 9/1992 | Yamada et al. | 215/228 X |

*Primary Examiner*—Allan N. Shoap
*Assistant Examiner*—Christopher J. McDonald
*Attorney, Agent, or Firm*—Sughrue, Mion, Zinn, Macpeak & Seas

[57] ABSTRACT

A container closure comprising a container closure shell and a resin liner applied to the inner surface side of the shell, wherein the resin liner is constituted by an upper layer portion which is composed of a resin composition containing such additives as disoxidation agent, drying agent, deodorant, antibacterial agent and thermo color agent and which forms a panel portion on the inside of the hermetically sealing portion, a lower layer portion which is composed of a thermoplastic resin having cushioning property and elasticity and which is interposed between the upper layer portion and the top surface of the shell to join them together, and a hermetically sealing portion which is formed on the outer peripheral side of the panel portion integrally with the lower layer portion. There is further provided a container closure with liner of the function separation type which is free from defects inherent in the conventional function addition-type container closures with liner, and which permits additional functions to be exhibited to a high degree without impairing hermetically sealing property, and a method of producing the same. Moreover, there is provided a method of producing the container closure with liner of the function separation type maintaining excellent produceability and high quality.

4 Claims, 2 Drawing Sheets

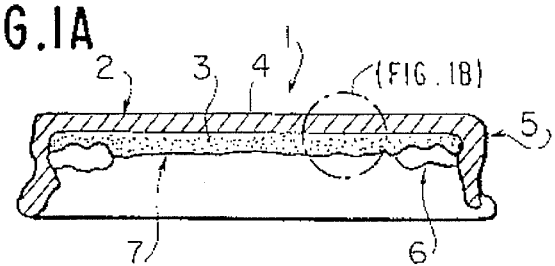
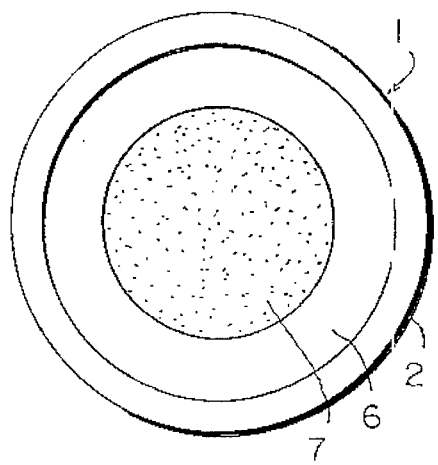
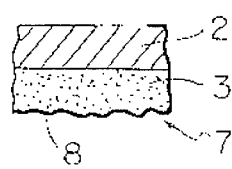
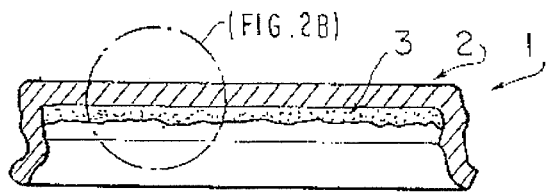
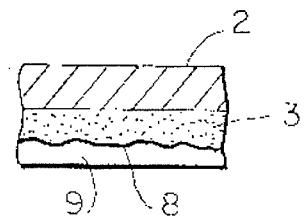
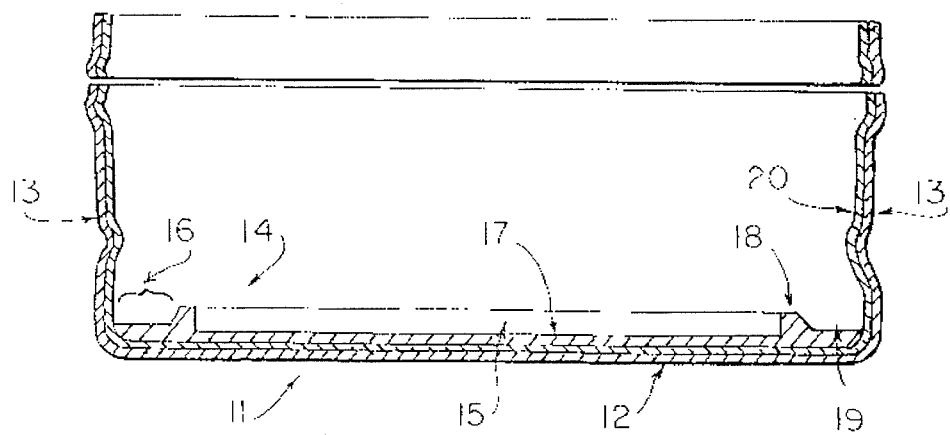

1ST STEP

2ND STEP

3RD STEP

CONTAINER CLOSURE WTH LINER AND METHOD OF PRODUCING THE SAME

This is a divisional of Application No. 07/879,351 filed May 7, 1992, now U.S. Pat. No. 5,381,914.

BACKGROUND OF THE INVENTION

(1) Field of the Invention

The present invention relates to a multi-functional container closure with liner and to a method of producing the same. More specifically, the invention relates to a container closure with liner which can be tightly sealed and which can be easily produced.

(2) Description of the Prior Art

A variety of functions have been imparted to the liner of a container closure by a method (in-shell molding) according to which a thermoplastic resin composition containing such additives as a oxygen absorbing agent, drying agent, deodorant, antibacterial agent, thermo color agent and like agent is molded as a single material in a container closure shell or by a method (packing attachment) according to which a material molded into a sheet is punched into a disc of a size nearly the same as the inner diameter of the container closure and is inserted with pressure in the container closure shell.

Among these additives in the container closure which uses the oxygen absorbing agent, oxygen remaining in the head space of the container must be quickly removed within a period from just after the sealing and keep a low oxygen concentration in the container for storage. In particular, the flavor retentivity of the content is closely related to the concentration of residual oxygen at the time of sterilization or pasteurization treatment. It has therefore been desired to provide a liner blended with an oxygen absorbing agent that is capable of removing oxygen remaining in the container within short periods of time after the sealing.

When the concentrations of additives in the liner are increased such that the additives exhibit their effects to sufficient degrees, the surface hardness of the resin increases and the flexibility decreases resulting in a drastic decrease in the cushioning property and elasticity of the liner material.

Furthermore, development of the functions of the additives due to chemical reactions and physical actions, causes many liner materials to lose their physical properties.

These phenomena directly deteriorate the hermetically sealing property which is most important among the properties required for the liner of the container closure, and it has been desired to solve this problem.

SUMMARY OF THE INVENTION

The object of the present invention is to provide a container closure which is capable of quickly removing oxygen remaining in the container in order to prevent the content from being deteriorated and the flavor from being lost.

Another object of the present invention is to provide a container closure with liner of the function separation type which permits additional functions to be exhibited to a high degree without impairing hermetically sealing property and a method of producing the same.

A further object of the present invention is to provide a method of producing the container closure with liner of the function separation type maintaining excellent produceability and high quality.

In a first aspect, the present invention is concerned with a container closure comprising a container closure shell and a resin liner or a resin packing applied to the inner surface side of the shell, wherein the resin liner or packing is provided with a layer of an oxygen absorbing resin composition blended with a oxygen absorbing agent, and fine roughness is formed over the whole surface of the oxygen absorbing resin composition layer inside the hermetically sealing portion on the inside of the container. The rough surface of the oxygen absorbing resin composition layer on the inside of the container closure may be exposed on the inside of the container closure but should preferably be covered with a thin oxygen-permeable resin film which prevents elution.

In a second aspect, the present invention is concerned with a container closure comprising a container closure shell and a resin liner applied to the liner surface side of the shell, wherein the resin liner is constituted by an upper layer portion which is composed of a resin composition containing such additives as oxygen absorbing agent, drying agent, deodorant, antibacterial agent and thermo color agent and which forms a panel portion on the inside of the hermetically sealing portion, a lower layer portion which is composed of a thermoplastic resin having cushioning property and elasticity and which is interposed between the upper layer portion and the top surface of the shell to join them together, and the hermetically sealing portion which is formed on the outer peripheral side of the panel portion integrally with the lower layer portion.

In order to produce the container closure of the above second aspect, furthermore, the thermoplastic resin composition having cushioning property and elasticity is fed in a molten form into the container closure shell, a panel-like disk made of a resin composition containing such additives as oxygen absorbing agent, drying agent, deodorant, antibacterial agent, thermo color agent and like agents is placed on the above molten material, and the laminate is pressed by a press mold in the container closure shell, such that the panel portion is joined to the top surface of the shell with the molten material and that the molten material is driven to the outer periphery of the panel portion thereby to form a hermetically sealing portion. In feeding the panel-like discs, it is recommended that a sheet of the resin composition containing additives is fed onto the container closure shell which is served with the resin of the molten form, the sheet is cut into a panel-like disk, and the disc that is cut is positioned on the molten resin in the shell.

BRIEF DESCRIPTION OF THE DRAWINGS

FIGS. 1A, 1B and 1C illustrate a container closure according to a first aspect of the present invention.

FIGS. 1A, 1B and 1C are a side sectional view of the container closure, a partially enlarged sectional view thereof and a plan view thereof as viewed from the side of the liner;

FIGS. 2A and 2B illustrate another container closure according to the first aspect of the present invention wherein FIGS. 2A and 2B are a side sectional view thereof and a partly enlarged sectional view thereof;

FIG. 3 is a side sectional view of a container closure (Example 1, 38 mm pilfer-proof cap) according to a second aspect of the present invention;

FIG. 5A shows an example of using a disc slider and FIG. 5B shows an example of using a setting arm.

DETAILED DESCRIPTION OF THE INVENTION

Figure 4A:
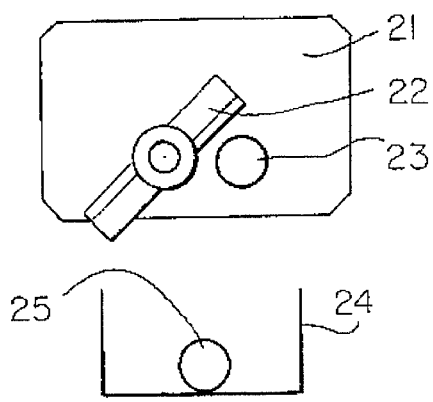
FIGS. 4A, 4B and 4C are a side view of arrangement illustrating the steps for producing the container closure according to the second aspect of the present invention. Accordingly, a first step feeds a molten resin in FIG. 4A, a second step feeds a panel disc, in FIG. 4B and a third step molds the liner in FIG. 4C.

When fine roughness is formed on the surface of the oxygen absorbing resin layer on the inner surface side of the container according to the present invention, the surface area increases considerably compared with that of the flat surface, and the amount of oxygen permeation into the layer increases per a unit time. Moreover, with the surface area being increased by the formation of fine ruggedness, the number of particles of the oxygen absorbing agent strikingly increases near the surface and the rate of diffusion increases.

Moreover, the presence of water is important for the chemical reaction between the disoxidation agent and oxygen and the amount of water greatly affects the rate of reaction. When fine roughness is formed on the surface of the oxygen absorption resin layer on the inner surface side of the container to increase the surface area in accordance with the present invention, water permeates in an increased amount into the oxygen absorbing agent and the rate of reaction increases between the oxygen absorbing agent and oxygen.

Being compounded by the above-mentioned facts according to the first aspect of the present invention, it becomes possible to quickly absorb oxygen in the head space. Moreover, partial pressure of oxygen decreases in the head space, oxygen dissolved in the content is emitted into the head space, and the content is prevented from being deteriorated and the flavor is not lost.

According to the second aspect of the present invention furthermore, a first feature resides in that a resin liner applied to the inner surface of the container closure shell is formed by a combination of a resin composition containing such additives as oxygen absorbing agent, drying agent, deodorant, antibacterial agent, thermo color agent and like agents, and a thermoplastic resin which does not contain such additives but has cushioning property and elasticity. The former resin composition containing additives and the latter thermoplastic resin having cushioning property are independent from each other, so that they will not affect each other and that the additional functions by the additives and the hermetically sealing action of the liner will be exhibited under optimum conditions relative to each other.

A second feature resides in that the resin composition containing such additives as oxygen absorbing agent, drying agent, deodorant, antibacterial agent, thermo color agent and like agents is provided as an upper layer portion which constitutes a panel portion on the inside of the hermetically sealed portion, the thermoplastic resin having cushioning property and resiliency is provided as a lower layer portion which is interporsed between the upper layer portion and the top surface of the shell to join them together, and a hermetically sealing portion is formed to protrude toward the outer peripheral side of the panel portion integrally with the lower layer portion.

The resin containing additives is provided as the upper layer of the liner and as a panel portion on the inside of the hermetically sealed portion. Therefore, the resin layer containing additives is allowed to be exposed in the container after it is sealed maintaining a maximum area without affecting the hermetically sealing property of the liner, and whereby the functions such as oxygen absorbing action, drying action, deodoring action, antibacterial action, heat sensing action and like actions are sufficiently exhibited. Moreover, the thermoplastic resin having cushioning property and resiliency exists on the outer peripheral side of the panel portion to form a hermetically sealed portion. Therefore, excellent sealing property is obtained stably even after the lapse of time. Moreover, since the thermoplastic resin having cushioning property exists as the lower layer portion even under the panel portion as a unitary structure as a whole, there is obtained an excellent liner from the standpoint of strength and structure of adhesion.

In producing the liner according to the second aspect, furthermore, the molten thermoplastic resin having cushioning property and resiliency is fed into the container closure shell, the panel-like disc made of the resin composition containing such additives as oxygen absorbing agent, drying agent, deodorant, antibacterial agent and thermo color agent is placed on the molten resin, and the laminate is pressed by the mold in the container closure shell. Due to the pressing force, therefore, the panel portion is joined to the top surface of the shell by the molten resin which is also driven out to the outer periphery of the panel portion to form the hermetically sealed portion. Therefore, the liner of the function separation type having the above-mentioned predetermined shape and predetermined structure is produced having high quality and at a high rate of production.

Container Closure

FIGS. 1(A), 1(B) and 1(C) are a side sectional view of a cap according to the first aspect of the present invention which is used for the container closure, i,e., bottle or the like, a partially enlarged sectional view thereof and a plan view thereof as viewed from the side of the liner. In the embodiment of FIG. 1, a container closure 1 is a crown cap which is made up of a container closure shell 2 and a liner 3 for hermetic sealing fitted into the shell. The shell 2 includes a top plate portion (center panel) 4 and a surrounding skirt portion 5 that are made of a metal as a unitary structure. The liner 3 for hermetic sealing is provided at a portion on the inner surface of the shell 2 that comes in engagement with the mouth of the container. The liner 3 is made of an oxygen absorbing resin composition which is blended with a oxygen absorbing agent in a dispersed manner.

The liner 3 includes a peripheral hermetically sealing portion 6 that engages with the mouth of the container and a center portion 7 that is exposed to the inner surface side of the container on the inside of the hermetically sealing portion 6. According to the present invention, fine roughness 8 is formed on the surface of the center portion 7. The resin composition blended with the oxygen absorbing agent may be provided on the whole surface of the liner or on the center portion 7 only of the liner that is exposed to the inner surface side of the container. With the whole liner being made of the resin composition blended with the oxygen absorbing agent, the manufacturing operation becomes simple giving an advantage. With the center portion only of the liner being made of the resin composition blended with the oxygen absorbing agent, on the other hand, the hermetically sealing portion is not affected by the oxygen absorbing agent giving another advantage. The hermetically sealing portion 6 of the liner that engages with the mouth of the container is thicker than the center portion 7 and reliably accomplishes hermetic sealing with respect to the container. The hermetically sealing portion 6 of the liner may have a flat structure but may further have rugged periphery that comes into engagement with the mouth.

FIGS. 2(A) and 2(B) are a side sectional view showing another container closure according to the first embodiment of the present invention and a partly enlarged sectional view thereof. The shell, the liner resin composition and the shapes thereof are nearly the same as those of FIG. 1. In this case, the finely rugged surface 8 of the oxygen absorbing resin composition of the container closure 1 is covered with a thin resin coating layer 9 for preventing elution.

In FIG. 3 (side sectional view) showing a container closure according to the second aspect of the present invention, container closure shell 11 is made up of a top plate 12 formed of, for example, a metal and a skirt portion 13. On the inner surface side of the top plate 12 is provided a thermoplastic resin liner which is generally designated at 14. The liner 14 includes an upper layer panel portion 15, a hermetically sealed portion 16 and a lower layer portion 17.

The upper layer panel portion 15 is made of a resin composition containing such additives as oxygen absorbing agent, drying agent, deodorant, antibacterial agent, thermo color agent and like agents, and is so provided as to be exposed in the container on the inside of the hermetically sealed portion 16 when it is hermetically sealed. The hermetically sealed portion 16 is made of a thermoplastic resin having cushioning property and elasticity, and is formed on the outer peripheral side of the panel portion 15. In this embodiment, the hermetically sealed portion 16 has a ring-like protuberance 18 of a relatively large thickness formed on the outer peripheral portion to engage with the bottle mouth, and a ring-like groove 19 is formed between the ring-like protuberance 18 and a skirt portion 13. The lower layer portion 17 is made of a thermoplastic resin having cushioning property and elasticity like the hermetically sealed portion 16, and is interposed between the upper layer panel portion 15 and the top surface 12 of the shell to join them together, and is formed integrally with the hermetically sealing portion 16. The shell may be provided on the inner surface thereof with a coating layer 20 for heat adhesion, so that the resin constituting the lower layer portion 17 is heat-adhered to the inner surface of the shell at the time when it is pressed and molded into the shape of a liner.

Production of Container Closure

The liner or packing of the container closure according to the first aspect of the present invention can be formed by any means in a manner that the aforementioned finely rough surface is formed. For instance, in the case where the molten resin or a plastisol is applied into the container closure shell and is molded into a liner, i.e., in the case of the in-shell mold, use is made of the mold having fine ruggedness formed on the surfaces of the mold such that fine roughness on the surfaces of the mold is transferred to the oxygen absorbing resin layer of the liner. In the case of the liner of polyethylene or the like, for example, the molten resin composition is applied to the inner surface side of the container closure shell and is pressed by a cold mold in order to mold a predetermined liner having finely rough surface. In the case of a soft vinyl chloride resin, furthermore, the plastisol is applied using a widely known means such as spin coating or the like and is pressed by a hot mold to obtain a desired shape. In the case of the packing, furthermore, fine ruggedness is formed on the surface of the oxygen absorbing resin layer of the packing using, for example, an embossed roll or the like. The liner or the packing is adhered to the closure shell by using a widely known adhesive primer, or a thermoplastic or a thermosetting adhesive, or by the heat adhesion without using any particular adhesive.

When the practical surface area is denoted by S and the projected surface area of the surface by So, the degree of fine roughness should be such that the ratio S/So is greater than 1.1 and, particularly, greater than 2 though it varies depending upon the increase in the surface area mentioned already. The projected surface area So is that of when the surface is quite smooth. When this surface is exposed, it is desired that a maximum height of roughness (Hmax) is greater than 0.1 mm, and particularly greater than 0.5 mm as measured by using a roughness tester. The fine roughness may have any pattern such as concentric form, cross-hatch form, random ruggedness, etc. Moreover, the pattern of fine ruggedness may be a V-shape, a U-shape or a rectangular shape in cross section.

In producing the above container closure of the second aspect, a panel-like disk is, first, prepared from the resin composition containing such additives as oxygen absorbing agent, drying agent, deodorant, antibacterial agent, thermo color agent and like agents. The thermoplastic resin composition having cushioning property and elasticity in a molten form is supplied into the container closure shell, the panel-like disc is placed on the molten composition, the laminate is pressed by the mold in the container closure shell, the panel portion is joined to the top surface of the shell with the molten resin which is also driven out to the outer periphery of the panel portion to form the hermetically sealing portion.

Figure 4B:
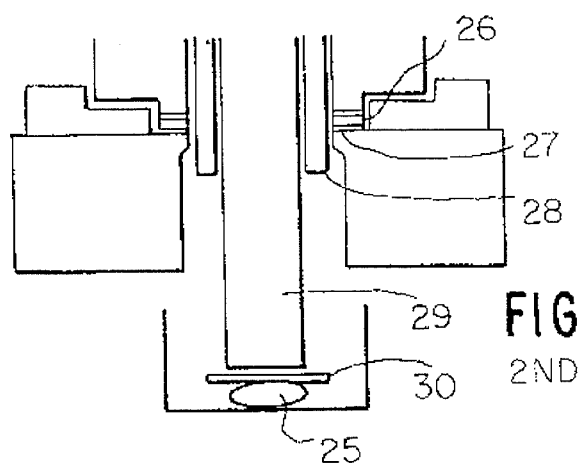
Figure 4C:
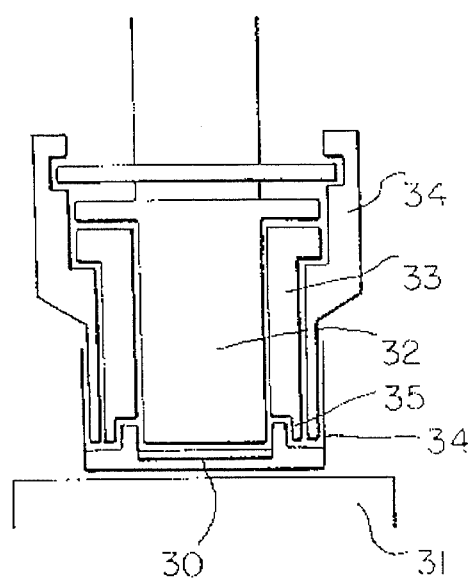

Referring to FIG. 4 which explains the steps of the method of the present invention, a mass 25 of molten resin is fed into a container closure shell 24 being extruded from a dies 23 of an extruder 21 and being cut by a rotary cutter 22 in a first step (step of feeding molten resin). The shell 24 may be heated in advance by such means as high-frequency induction heating prior to feeding the mass 25 of resin. It is desired that the mass 25 is temporarily adhered by heating into the sell 24.

At a second step (step of feeding panel disc), a panel-like disc 30 of a resin composition containing such additives as oxygen absorbing agent, drying agent, deodorant, antibacterial agent and thermo color agent that has been formed in advance, is fed onto the mass 25 of molten resin in the shell 24. In this embodiment, a sheet 26 of an additive-containing resin composition is fed into between a die cutter 27 and a punch cutter 28 positioned over the shell 24, and the punch cutter 28 descends to cut the sheet 26 into a panel-like disc 30 of a predetermined size. A disc insertion rod 29 is provided to move up and down in concentric with the punch cutter 28, and holds the panel disc 30, that is cut at its tip and descends to place it on the mass 25 of molten resin.

At a third step (step of molding the liner), the shell 24 having the panel-like disc 30 and the mass 25 of molten resin is fed to a pressing operation station, and is supported by an anvil 31. At this time, press molds 32, 33 and a sleeve 24 located over the anvil 31 move down. The central press mold 32 has a size that corresponds to the panel-like disc 30 and further has a flat or smooth curved surface for forming a thin liner portion. The press mold 33 of a cylindrical form has a ring-like recessed portion 35 along the periphery to form ring-like protuberance of the liner.

First, the sleeve 34 engages with the peripheral edge in the skirt of the shell 24 to firmly hold the shell 24 and, then, the press molds 32 and 33 move down to press the mass 25 of molten resin via the panel-like disc 30. Therefore, the mass 25 of molten resin spreads rapidly in the radial direction, and is molded into a liner and adheres to the inner surface of the shell. The liner is maintained under this pressed condition for a predetermined period of time and is gradually cooled entirely by a cooling mechanism (not shown) provided in the anvil 31 and in the press molds 32, 33; i.e., a solidified liner is formed. The sleeve 34 and the press molds 32, 33 are moved up, and there is obtained a container closure having a composite liner that is press-molded. The air that exists between the press mold 33 and the shell 24 is exhausted to the external side through a gap between the press mold 33 and the sleeve 34.

Figure 5A:
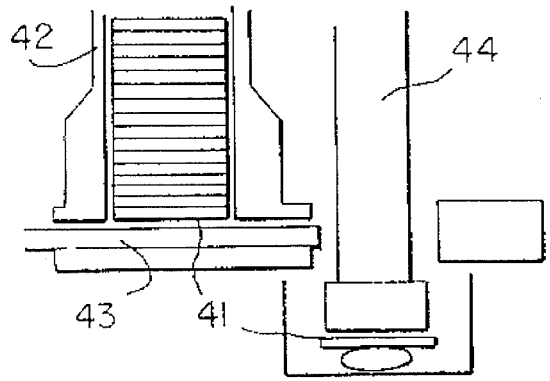
FIGS. 5A and 5B are a side view of arrangement illustrating the step of feeding the panel disc of FIG. 4B according to a modified aspect.
Figure 5B:
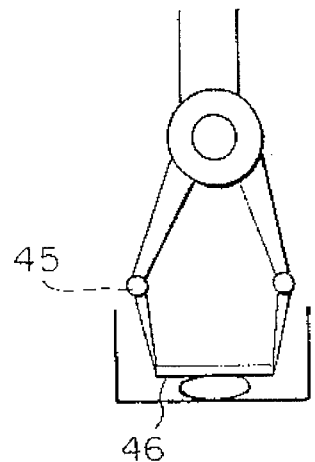

Here, the panel-like disc can be inserted by any other method instead of employing the second step of FIG. 4. Referring to FIG. 5(A), the discs 41 which have been punched in advance are contained in a disc cassette 42, slid by a disc slider 43, and is set onto the mass of molten resin by a disc insertion rod 44. Or, referring to FIG. 5(B), the panel-like discs 41 are set by using a setting arm 45.

Container Closure Shell

According to the present invention, a metal a plastic material or a laminate thereof is used as a material for constituting the container closure shell. Examples of the metal material include light metals such as a surface-untreated steel (black plate) in the form of a sheet or a foil, a surface-treated steel, aluminum, and the like. Examples of the surface-treated steel include those which are chemically treated, e.g., a steel substrate treated with phosphoric acid or chromic acid; those subjected to chemical treatment such as electrolytic treatment with chromic acid; those subjected to electrolytic plating such as electrolytic size plating, electrolytic chromium plating; those subjected to fused aluminum plating; and those subjected to fused plating such as fused tin plating. The thickness should generally range from 1 to 200 μm.

On the surfaces of these metal materials may be applied one or two or more layers of any protective coating and undercoating for heat adhesion to the liner that are known per se. Suitable examples of the protective coating include a phenol-epoxy coating, an epoxy-urea coating, an epoxy-melamine coating, a phenol-epoxy-vinyl coating, an epoxy-vinyl coating, a vinyl chloride-vinyl acetate copolymer coating, a vinyl chloride-vinyl acetate-maleic anhydride copolymer coating, an unsaturated polyester coating and a saturated polyester coating, which may be used alone or in a combination of two or more kinds. When the protective coating does not exhibit adhesiveness to the thermoplastic resin of which the liner is made, there may be applied a coating for heat adhesion to liner, i.e., a known olefin resin coating for heat adhesion such as a coating obtained by dispersing an oxidized polyethylene or an acid-modified olefin resin in the coating-forming resin, the coating being applied onto the metal material directly or via the protective coating.

These coated metal materials can be formed into container closures of any shapes such as a crown cap, a pilfer-proof cap, a score breakdown-type easy open cap with tab, a screw cap, a lug cap, and a twist-off cap which are placed in practical use.

The resin container closure is in the form of a cap obtained by injection-molding a resin or press-molding a resin. Examples of the molding resin are heat-moldable resins such as olefin-type resins, e.g., a medium- or a high-density polyethylene, an isotactic polypropylene, an ethylene-propylene copolymer, a polybutene-1, ethylene-butene-1 copolymer, a propylene-butene-1 copolymer, an ethylene-propylene-butene-1 copolymer, an ethylene-vinyl acetate copolymer, an ionically crosslinked olefin copolymer (ionomer) or a blend thereof; polystyrene, a styrene-butadiene copolymer; an ABS resin; and a polycarbonate. It is further allowable to use a cap having a multi-layer structure formed by co-injection or multi-stage molding. In this case, the intermediate layer should desirably be made of a resin rich in oxygen barrier property such as an ethylene-polyvinyl copolymer and a vinylidene chloride.

Thermoplastic Resin for Forming Hermetically Sealing Portion

In the second aspect, examples of the thermoplastic resin constituting the hermetically sealing portion and the lower layer portion include various soft plastics and elastomers such as olefin resins, e.g., low-medium-and high-density polyethylenes, an isotactic polypropylene, a propylene-ethylene copolymer, polybutene-1, an ethylene-propylene copolymer, polybutene-1, an ethylene-butene-1 copolymer, a propylene-butene-1 copolymer, a propylene-butene-1 copolymer, an ethylene-propylene-butene-1 copolymer, an ethylene-vinyl acetate copolymer, an ionically crosslinked olefin copolymer (ionomer) and a blend thereof; rubber olefin-type elastomers such as an ethylene-propylene copolymer rubber, an ethylene-propylene copolymer rubber, an ethylene-propylene-diene copolymer rubber; a hydrogenated ethylene-propylene-diene copolymer; an SBS elastomer, a butyl rubber, SBR, etc. Which are used in one kind or in two or more kinds. They are applied in a molten form into the shell and are molded under cooled condition to form a desired liner. The olefin-type resin is favorably molded into the liner, exhibits excellent sealing property as well as excellent property for retaining flavor such as of beverages contained in the containers.

Thermoplastic resins which are particularly advantageous for accomplishing the object of the present invention include a low-density polyethylene, an ethylene-type copolymer and the like. From the standpoint of improving liner properties and orientation, it is desired to use a composition consisting of a low-density polyethylene which is blended with at least one of (a) an ethylene-propylene copolymer, (b) a thermoplastic elastomer, particularly a styrene-diene (butadiene or isoprene)-styrene block copolymer. It is desired that these reforming components are contained in amounts of 3 to 40% by weight with respect to the low-density polyethylene.

The thermoplastic resin used in the present invention may be blended with widely-known blending agents such as white and colored pigments, e.g., titanium white, carbon black, etc.; fillers such as calcium carbonate, white carbon, clay, etc.; an antioxidizing agent; a lubricating agent; a plasticizer; an antistatic agent; a heat stabilizer, etc.

The thermoplastic resin forming the hermetically sealing portion may be a soft vinyl chloride resin which can be press-molded by melt extrusion like the olefin-type resin after the panel-like disc has been placed thereon.

As the vinyl chloride-type resin, there can be used, in addition to a monopolymer of vinyl chloride, a vinyl chloride and a small amount of comonomer such as a copolymer with vinyl acetate, vinylidene chloride, acrylic acid ester, methacrylic acid ester and butadiene. The average polymerization degree of these vinyl chloride resins is not specifically limited but should generally range from 500 to 3000. The vinyl chloride-type resin may be the one having relatively fine particles sizes obtained by the emulsification polymerization, the one having relatively coarse particle sizes obtained by the suspension polymerization, or a mixture thereof to accomplish the object of the present invention.

The vinyl chloride resin may contain a blending agent which has been known per se. Examples of the plasticizer may be those which are usually used for the vinyl chloride-type resins such as a phthalic acid ester-type plasticizer, e.g., DOP, DOB; an aliphatic dibasic ester-type plasticizer such as DOA, SOA; a phosphoric acid ester-type plasticizer; a hydroxypolyhydric carboxylic acid ester-type plasticizer; a fatty acid ester-type plasticizer; a polyhydric alcohol ester-type plasticizer; an epoxy-type plasticizer; and a polyester-type plasticizer, which can be used alone or in a combination of two or more kinds. Examples of the stabilizer include a metal soap-type stabilizer, an organotin-type stabilizer and an organophosphoric acid ester-type stabilizer. Examples of the filler include calcium carbonate, fine powdery silica, magnesium carbonate, talc, and baked clay. Examples of the pigment include titanium white, carbon black and the like. Examples of the foaming agent include azodicarbonamide, 4,4-oxybis(benzenesulfonyl) hydrazide, etc., and examples of the lubricating agent include a microcrystalline wax, a paraffin wax, a polyethylene wax, a silicone oil, and a fatty acid amide-type lubricating agent.

Examples of the coating material that exhibits strong adhesiveness to the vinyl chloride resin liner include a vinyl chloride-type coating material and an acrylic coating material.

Liner and Panel-Like Disc

In the first aspect of the present invention, the liner made of the resin composition blended with a predetermined amount of oxygen absorbing agent is formed on the whole surface of top plate of the cap shell and in the second aspect of the present invention, the panel-like disk is made of the resin composition blended with predetermined amounts of such additives as oxygen absorbing agent, drying agent, deodorant, antibacterial agent and thermo color agent depending upon the kinds of contents and applications. Examples of the additives that are used are as described below which, however, are in no way limited thereto only.

(1) Oxygen Absorbing Agent

Any conventional inorganic or organic oxygen absorbing agent used for the purpose of this kind can be used as the oxygen absorbing agent for the present invention. As will be described later, furthermore, there may be used a composition obtained by blending a resin with a catalyst for oxidation with oxygen so that the resin itself is oxidized. As desired, furthermore, there may be added as promotors those which directly assist the oxygen absorbing agent and those which work to improve oxygen permeation coefficient and water adsorption amount, together with the disoxidation agent.

Examples of the oxygen absorbing agent are as described below.

(A) Inorganic Oxygen absorbing Agent

Concrete examples of the inorganic disoxidation agent include metals of the group of irons such as iron powder or iron powder coated with a metal halide, and iron carbide, iron silicate and alloys of metals of other group of irons; and compounds of divalent metals of the group of irons such as ferrous sulfate, ferrous chloride, ferrous oxide, etc. which should desirably be used together with a promoter that will be described later. The oxygen absorbing agent may be either soluble in water or insoluble. It is, however, desired to use the water-insoluble oxygen absorbing agent such that the flavor retentivity of the content is not lost. It is further desired to knead the resin together with the oxygen absorbing agent of a granular form such that it will not elute out.

(B) Organic Oxygen Absorbing Agent

Concrete examples of the organic oxygen absorbing agent include polyhydric phenols or phenol-type resins such as catechol, pyrogallol, etc,; ascorbic acid, Erythorbic acid, ascorbate, Erythorbic acid salt, or tocophenols; saccharides and enzymatic agents thereof such as glucose, fructose, galactose, maltose, cellobiose, etc.; hydroquinone, gallic acid, etc. From the standpoint of flavor retentivity of the content and preventing migration or elution into the content, it is desired to use the phenol-type resin as the organic oxygen absorbing agent which is insoluble in water and having a large molecular weight.

A preferred example of the phenol-type resin is a hydroquinone aldehyde resin. This disoxidation agent consists of a resin having oxygen absorbing groups on the molecular chain and, particularly, a hydroquinone aldehyde resin having a plurality of phenolic hydroxyl groups per a ring in the phenol skeleton. It is desired that the oxygen absorbing agent usually has an average particle diameter which is smaller than 100 μm and, particularly, smaller than 50 μm.

An example of the resin blended with a catalyst for oxidation with oxygen so that the resin itself can be oxidized may be a polyamide resin to which is added a compound containing transition metals.

Promotors that can be added together with the oxygen absorbing agent may be a substance that acts directly to the oxygen absorbing agent and a substance that quickens the feed of water to the oxygen absorbing agent. Addition of these promotors quickens the removal of oxygen.

It is desired that the substance that directly acts upon the oxygen absorbing agent is blended in an amount over a range of from 1 to 1000 parts by weight and, particularly in an amount of 1 to 200 parts by weight per 100 parts by weight of the oxygen absorbing agent. Examples of these substances may be those which are generally used such as sodium chloride, potassium chloride, calcium chloride, sodium sulfate and sodium nitrate. Further, the organic oxygen absorbing agent or the inorganic oxygen absorbing agent is usually greatly promoted on the alkaline side. In particular, it is desired to use a solid base as a promoter. The solid base should desirably be insoluble in water from the standpoint of flavor retentivity of the content and sanitary properties, and its examples include zinc oxide, magnesium carbide, silicate, anion-exchange resin, zeolite, melamine resin, urea resin, ammonia resol resin, and like resins.

A hydrophilic substance can be provided as a dispersion phase in the resin to promote the oxygen absorption reaction of the oxygen absorbing agent. Concrete examples of the hydrophilic substance are as described below and should increase their weight by more than 1% and, particularly, by more than 2.0% in the working examples when immersed in pure water maintained at 20° C. for 24 hours as measured in compliance with the testing method stipulated under JIS.

Examples of the hydrophilic substance are water absorbing resins such as polyvinyl alcohol, polyethylene oxide modified product, etc. The polyethylene oxide modified product is obtained by grafting the polyethylene oxide with an ethylenically unsaturated carboxylic acid or an anhydride thereof such as maleic anhydride, acrylic acid, methacrylic acid, crotonic acid, or itaconic anhydride. Due to many ether recurring units and the grafted carboxyl groups, this resin absorbs large amounts of water. Moreover, since ether groups play a major role of absorbing water, the resin exhibits excellent heat resistance and can be heat-molded giving an advantage. It is also allowable to use vinyl acrylate-alcohol copolymers such as Sumika Gel$^R$ and the like though their heat resistance is slightly inferior to that of the polyethylene oxide modified product.

In addition to the above, there can be further used cellulose derivatives such as methyl cellulose, ethyl cellulose, hydroxypropylmethyl cellulose, hydroxyethyl cellulose and carboxymethyl cellulose, and hydrophilic high molecular compounds such as a partly saponified product of polyvinyl acetate, polyvinylmethyl ether, polyacrylic acid, polymethacrylic acid, a vinylmethyl ether. maleic anhydride copolymer, polyvinyl pyrrolidone, an acrylamide/acrylate copolymer, a partly saponified product of acrylamide/methylene-bisacrylamide copolymer, a partly saponified product of vinyl acetate/methyl acrylate, a polyoxyethylene compound, polystyrene sulfonate, poly-2-acrylamide-2-methylpropane sulfonate, gelatin, modified casein, modified starch, sodium arginate, and a tragacanth rubber.

These hydrophilic substances should be used in amounts of 5 to 60% by weight per the whole resin.

(2) Drying Agent or Moisture-Absorbing Agent

As the moisture-absorbing agent, there can be used a deliquescent inorganic salt, a deliquescent organic compound or a highly water absorbing resin. Examples of the deliquescent substance includes inorganic salts such as sodium chloride, calcium chloride, zinc chloride, ammonium chloride, ammonium sulfate, sodium sulfate, magnesium sulfate, disodium hydrogenphosphate, sodium diphosphate, sodium pyrophosphate, potassium pyrophosphate, potassium carbonate, and sodium nitrate; and organic compounds such as glucose, fruit sugar, sucrose, gelatin, modified casein, modified starch, tragacanth rubber, polyvinyl alcohol, carboxymethyl cellulose and sodium arginate. The highly water absorbing resin can be defined as a resin that is substantially insoluble in water and that is capable of absorbing water in amount of several tens to several hundreds of times as great as its weight. The highly water absorbing resin usually has ionizing groups that contribute to absorbing water and further has a mesh-like or crosslinked structure or a gel-like structure that makes the resin insoluble in water.

Examples of the highly water absorbing resin include copolymers of graft derivatives of the type of starch or cellulose such as acrylic acid (salt)-grafted starch, acrylonitril-grafted hydrolyzed product of starch and acrylic acid (salt)- grafted cellulose or crosslinked polyacrylic acid (salt) or, particularly, acrylic acid (salt) with a multifunctional monomer such as divinyl benzene or a hydrophobic monomer such as styrene, acrylic esters, etc.; a vinyl alcohol-acrylic acid (salt) block copolymer prepared by saponifying a copolymer of vinyl acetate and an acrylic ester; and a modified polyvinyl alcohol obtained by reacting a polyvinyl alcohol with an acid anhydride such as maleic anhydride or phthalic anhydride and introducing carboxyl groups and crosslinked structure simultaneously to the side chains. In these resins, the starch, cellulose or polyvinyl alcohol component works to insolubilize the polyacrylic acid component to maintain it in a gel form. It is allowable to use all of these highly water absorbing resins. Among them, it is desired to use the crosslinked polyacrylic acid (salt) which is produced by Seitetsu Kagaku Co. and is placed in the market in the trade name of Aquakeep 4S, Aquakeep 10SH. Another suitable example is a vinyl alcohol-acrylic acid (salt) block copolymer which is produced by Sumitomo Kagaku Co. and is placed in the market in the trade name of Sumika Gel 5S. In addition to them, there can further be used a polyethylene oxide modified product which has been placed in the market in the name of Sumika Gel R-30.

As the drying agent, there can be used silica gel, alumina gel, silica-alumina gel or a variety of zeolites.

(3) Deodorant

As the deodorant, there can be used any known deodorant such as active carbon, silica gel, alumina gel, silica-alumina gel, magnesium silicate, zinc silicate, calcium silicate, titanium hydroxide gel, zinc titanate, active zinc flower, zirconium hydroxide, activated clay, silica phosphate, titanium phosphate and zeolite in one kind or in a combination of two or more kinds, as well as organic substance such as cyclodextrin.

(4) Antibacterial Agent

As the antibacterial agent, there can be used any of those known antibacterial agents and fungicidal agents (preservatives) for foods. Examples include silver compounds such as metal silver, silver oxide, silver carbonate, and silver-deposited zeolite, high molecular substance such as polymer crosslinked with silver ions, as well as benzoic acid, sodium benzoate, o-phenylphenol, o-phenylphenol sodium, diphenyl, sorbic acid, potassium sorbite, thiapentazole, dehydroacetic acid, sodium dehydroacetate, paraoxybenzoic acid esters, propionic acid, calcium propionate, and sodium propionate.

(5) Thermo color agent

As the thermo color agent, there can be used any known thermo color pigments, i.e., inorganic compounds, leuco dyes, phenyl-type compounds and high molecular liquid crystals such as complex salt of ammonium oxide, iron oxide, and molybdenum oxide ($3(NH_4)_2O$ $FeO_3$ $12MoO_3$ $19H_2O$), $Cu(OH)_2$, $CdCO_3$, $(NH_4)_3VO_3$, $Ag_2Hg_4$, $Cu_2HgI_4$ either in one kind or in a combination of two or more kinds.

(6) Others

In the present invention, the additives contained in the panel-like disc are in no way limited to the above exemplified materials only. In addition to the above, there can be further used aromatic agents or perfume components. The essence of odor or the perfumes can be used directly or being blended in the form of inclusion compounds or microcapsules. Examples of the essence of odor or perfume include perfume or essence for fruits such as lemon oil, orange flavor, apple essence, vanila essence and grape essence; and cinamon, cardamon, coriander, ginger, coffee perfume and chocolate perfume.

Any resin can be blended with the above additives without any problem provided it is a thermoplastic resin. The following resins can be used depending upon the applications: i.e., olefin resins such as a low-, a medium- or a high-density polyethylene, an isotactic polypropylene, a propylene-ethylene copolymer, polybutene-1, an ethylene-propylene copolymer, polybutene-1, an ethylene-butene-1 copolymer, a propylene-butene-1 copolymer, a propylene-butene-1 copolymer, an ethylene-propylene-butene-1 copolymer, an ethylene-vinyl acetate copolymer, an ionically crosslinked olefin copolymer (ionomer), a polyvinyl alcohol or a blend thereof; a polyamide resin such as nylon 6, nylon 6,6, poly(m-xylylene adipamide); a polyester resin such as polyethylene terephthalate (PET); a polycarbonate; a vinyl chloride resin, etc.

The resin constituting the liner and the panel-like disc may be the same as or different from the resin that constitutes the hermetically sealing portion in the aforementioned second aspect and, generally, a combination is selected such that thermal adhesiveness is exhibited between the two. From this point of view, it is desired to select a resin having constituent units which are common to those of the main resin. Moreover, the panel-like disc is applied as a premolded material. As desired, therefore, an adhesive may be applied to the thermally adhering surfaces of the panel-like disk. Moreover, monoaxial or biaxial molecular orientation may be imparted to the panel-like disc.

The additives are blended in the resin in amounts that vary depending upon the kinds of additives and the required properties. In the first embodiment, the oxygen absorbing agent is added in an amount of 0.1 to 100 parts by weight and, particularly, in an amount of 5 to 50 parts by weight per 100 parts by weight of the resin. In the second embodiment, the oxygen absorbing agent is added in an amount of 5 to 200 parts by weight and, particularly, in an amount of 10 to 60 parts by weight per 100 parts by weight of the resin. The drying agent is added in an amount of 5 to 100 parts by weight and, particularly, 10 to 60 parts by weight per 100 parts of the resin, the deodorant is added in an amount of 1 to 100 parts by weight and, particularly, 10 to 60 parts by weight per 100 parts by weight of the resin, the antibacterial agent is added in an amount of 0.1 to 50 parts by weight and, particularly, in an amount of 0.5 to 20 parts by weight per 100 parts by weight of the resin, the thermo color agent in used in an amount of 0.1 to 50 parts by weight and, particularly, 0.5 to 20 parts by weight per 100 parts by weight of the resin, and the aromatic agent or the perfume component is added in an amount of 0.001 to 10 parts by weight and, particularly, 0.01 to 1.0 part by weight per 100 parts by weight of the resin.

In the present invention, the liner and the panel-like disc blended with additives exist in the container. When the additives are likely to elute out, therefore, it is desired to form a thin coating layer on the liner and on the disc to prevent elution. An optimum coating layer is selected depending upon the applications. Suitable examples of the resin for preventing elution include polyolefin resin, soft vinyl chloride resin, various synthetic rubbers, porous polyolefin and silicone resin which are formed maintained a thickness of 1 to 100 μm. The coating layer can be provided on the exposed surface of the liner in the form of a coating solution or a film. When the oxygen absorbing agent is to be blended, in particular, the coating layer permits oxygen or water vapor to pass through but does not permit liquid water to pass through. A suitable coating layer should be composed of a resin having an oxygen permeation coefficient of greater than $10 \times 10^{-12}$ cc.cm/cm$^2$.sec.cmHg and, particularly, greater than $50 \times 10^{-12}$ cc.cm/cm$^2$.sec.cmHg.

The amount of the resin supplied into the container closure shell varies depending upon the size of the shell and, usually, ranges from 100 mg to 10 g. The thickness of the panel-like disc should generally range from 0.3 to 2.0 mm, and the amount thereof should range from 20 to 90% by weight of the whole liner.

According to the present invention, furthermore, fine roughness of the second aspect may also be formed on the panel-like disc, so that the functions of the additives can be fully exhibited.

EXAMPLES (Example 1)

Oxygen absorbing resin compositions for forming liners obtained by blending various resin compositions with a predetermined oxygen absorbing composition were melt-extruded into the aluminum cap shells to obtain caps with liner. In this case, roughness was formed on the bottom of a punch for forming liners in concentric therewith in an attempt to increase the surface areas of the liners. The surface area was changed by changing the gaps of the concentric roughness. 1.0-Liter polyethylene terephthalate (PET) bottles containing an orange juice-like liquid of an aqueous solution containing 28 mg % of ascorbic acid and 0.5 mg % of β-carotene were sealed using these caps, and the oxygen concentrations in the bottles were measured every after a predetermined period of time. The head space capacity was 85 ml. Though the model liquid itself undergoes deterioration by consuming oxygen, it will be understood that the caps with liner of the present invention cause the oxygen concentration to quickly decrease in the bottles; i.e., oxygen is absorbed in considerable amounts by the liners. It is further obvious that the rate of absorbing oxygen increases with an increases in the surface area.

Properties and results were as shown in Table 1.

Table 1 also shows the results of the caps having liners (S/So=1) formed by using a punch having a flat bottom which are products for comparison as well as the results of a cap having liner with flat bottom without containing oxygen absorbing agent which is a reference product.

(Example 2)

A cap shell was lined with a mixture of an emulsion polymerization-type polyvinyl chloride resin (PVC), a plastisol consisting chiefly of a plasticizer and an oxygen absorbing composition. The lining was gelled by heating while holding it with a punch having a rugged bottom. Moreover, a sol without containing oxygen absorbing agent was applied in the form of a doughnut onto the inside of the skirt portion of the cap shell. The sol containing the oxygen absorbing agent assumed a circular shape 38 mm in diameter. A similar cap with liner was prepared using a punch with flat bottom as a product for comparison and a cap with liner was prepared as a reference product, the liner having a flat bottom without containing oxygen absorbing agent. 1.0-Liter glass bottles containing an orange juice-like liquid were hermetically sealed using these caps. The head space capacity was 55 ml. The oxygen concentrations in the head space in the containers were measured every after a predetermined period of time. The results were as shown in Table 1. It is obvious that the rate of oxygen reduction increases with an increases in the surface area.

(Example 3)

A plastisol compound was applied on a portion of a cap that comes in contact with the mouth of bottle, the cap having a liner (S/So=2.0) made of a material obtained by mixing an iron-type oxygen absorbing composition into a resin composition made up of polyethylene/polyvinyl alcohol according to Example 1. The properties were evaluated in the same manner as in Example 1. Though the surface area of the oxygen absorbing liner exposed to the side of the head space was reduced by the application of the lining agent, good properties were exhibited compared with those of the comparison product having a flat liner surface. The results were as shown in Table 1.

(Example 4)

A cap with liner having rough surface was prepared using a resin composition containing iron-type oxygen absorbing material according to Example 1. A silicone resin solution was applied to the surface and was solidified by drying. The cap was fitted to a PET bottle filled with an orange juice-like liquid, and oxygen remaining in the head space was measured every after a predetermined period of time. Though the rate of oxygen absorption decreases due to the provision of the coating layer, excellent results were obviously obtained compared with those of the cap of the same material (comparisons product) without having rough surface. The results were as shown in Table 1.

by hot cutting to the central portion of a PP (pilfer-proof) can shell having a diameter of 38 mm, and a disc of a low-density polyethylene-type resin blended with 65 PHR of an iron-type oxygen absorbing agent punched into a diameter of 27 mm was placed thereon followed immediately by pressing by using a press mold to accomplish the molding in a predetermined shape.

TABLE 1

| | Properties and results | | | | | | | | |
|---|---|---|---|---|---|---|---|---|---|
| | Liner | | | | | Oxygen concentration (%) | | | |
| | | | Oxygen | | | in head space | | | |
| | Cap shape | Resin composition | absorbing agent | Blending amount | Shape (S/So) | After 3 days | After 1 week | After 2 weeks | After 1 month |
| Example 1 | | | | | | | | | |
| Product 1 of invention | Al 38 mm in diameter | PE/PVA | Iron-type composition | 30% | 1.2 | 11 | 8.5 | 3.4 | 1.8 |
| Product 2 of invention | Al 38 mm in diameter | PE/PVA | Iron-type composition | 30% | 1.5 | 8.7 | 6.9 | 2.8 | 1.4 |
| Product 3 of invention | Al 38 mm in diameter | PE/PVA | Iron-type composition | 30% | 2.0 | 6.2 | 4.8 | 1.9 | 0.9 |
| Comparison product 1 | Al 38 mm in diameter | PE/PVA | Iron-type composition | 30% | 1.0 | 13 | 10 | 4.0 | 2.1 |
| Reference product 1 | Al 38 mm in diameter | PE/PVA | — | — | 1.0 | 16 | 14 | 8.0 | 5.7 |
| Product 4 of invention | Al 38 mm in diameter | EVA/PVA | Iron-type composition | 30% | 2.0 | 7.2 | 6.0 | 3.0 | 1.3 |
| Comparison product 2 | Al 38 mm in diameter | EVA/PVA | Iron-type composition | 30% | 1.0 | 14 | 11 | 5.1 | 2.8 |
| Product 5 of invention | Al 38 mm in diameter | PE/PVA | Organometal complex type | 30% | 2.0 | 14 | 12 | 7.0 | 5.1 |
| Comparison product 3 | Al 38 mm in diameter | PE/PVA | Organometal complex type | 30% | 1.0 | 15 | 13 | 7.6 | 5.3 |
| Product 6 of invention | Al 38 mm in diameter | PE/PVA | Ascorbate | 30% | 2.0 | 13 | 10 | 6.3 | 4.0 |
| Comparison product 4 | Al 38 mm in diameter | PE/PVA | Ascorbate | 30% | 1.0 | 14 | 12 | 7.1 | 5.1 |
| Example 2 | | | | | | | | | |
| Product 7 of invention | Steel 54 mm in diameter | PVC sol | Iron-type composition | 30% | 2.0 | 7.0 | 1.0 | 0.1 | 0 |
| Comparison product 5 | Steel 54 mm in diameter | PVC sol | Iron-type composition | 30% | 1.0 | 12 | 5.6 | 2.5 | 0.1 |
| Reference product 2 | Steel 54 mm in diameter | PVC sol | — | — | 1.0 | 17 | 13 | 9.0 | 4.0 |
| Example 3 | | | | | | | | | |
| Product 8 of invention | Steel 54 mm in diameter | PVC sol | Iron-type composition | 30% | 2.0 | 7.9 | 1.8 | 0.3 | 0 |
| Comparison product 6 | Steel 54 mm in diameter | PVC sol | Iron-type composition | 30% | 1.0 | 12.7 | 6.0 | 3.1 | 0.2 |
| Example 4 | | | | | | | | | |
| Product 9 of invention | Al 38 mm in diameter | PE/PVA | Iron-type composition | 30% | 2.0 | 6.5 | 5.0 | 2.0 | 1.1 |
| Comparison product 7 | Al 38 mm in diameter | PE/PVA | Iron-type composition | 30% | 1.0 | 14 | 12 | 4.9 | 3.1 |

PE: polyethylene
PVA: Polyvinyl alcohol
PVC: polyvinyl chloride
S/So: real surface area/projected surface area (Example 5)

A. Preparation of Container Closures

About 1 g of a low-density polyethylene resin blended with 0.1 PHR of erucic amide (parts by weight blended per 100 parts by weight of the resin) as a lubricating agent and with 0.3 PHR of titanium oxide as a coloring agent was fed FIG. 3 is a sectional view of the container closure and FIG. 4 is a diagram schematically illustrating the method of producing the container closure.

B. Evaluation of Container Closures

A sterilized 1-liter PET bottle was aseptically filled with an orange juice and was wrap-seamed with a container closure obtained by the method described in A above after it has been sterilized. For the purpose of comparison, a liner was extrusion-molded by using only a resin composition that was used for molding the panel-like disc in order to obtain a container closure for comparison.

Table 2 shows the results of oxygen absorbing ability of these container closures as confirmed in terms of oxygen concentrations in the head space of the filled containers.

There is no significant difference in the change of oxygen concentration between the two. There is not substantial drop in the oxygen absorbing ability of the container closure of the present invention despite the area of the oxygen absorbing agent-containing resin is slightly reduced compared with that of the container closure prepared according to the prior method.

The hermetically sealing property was evaluated by conducting the following two kinds of testings.

(a) Thermal Shock Testing

After left to stand one day at 45° C. and 50° C., the container is quickly quenched to 0° C. to make sure the occurrence of leakage.

(b) Inverted Fall Testing

After left to stand one day at 50° C., the temperature is returned to room temperature and the container is permitted to fall upside down from a predetermined height onto a steel surface that is tilted at an angle of 20° C. to make sure if leakage occurred.

The results of these testings are shown in Tables 3 and 4. The results of testing indicate that the container closure of the present invention obviously makes it possible to improve hermetically sealing property without markedly deteriorating the oxygen absorbing ability.

TABLE 2

| Oxygen concentration in the head space. | | | | |
|---|---|---|---|---|
| | Immediately after filled | 10 days | 30 days | 90 days |
| Comparison product | 20.9% | 5.3% | 0.5% | 0.5% |
| Product of the invention | 20.9% | 7.6% | 0.9% | 0.6% |

TABLE 3

| Leakage rate after the thermal shock testing | | |
|---|---|---|
| | 45° C. | 50° C. |
| Comparison product | 10% | 20% |
| Product of the Invention | 0% | 0% |

TABLE 4

| Leakage rate after the inverted fall shock testing | | | | |
|---|---|---|---|---|
| Height of fall | 10 cm | 20 cm | 30 cm | 40 cm |
| Comparison product | 0% | 0% | 0% | 40% |
| Product of the invention | 0 | 0% | 0% | 0% |

(Example 6)

A. Preparation of the Container Closures

About 0.4 g of a low-density polyethylene resin blended with 0.1 PHR of erucic amide and 0.3 PHR of titanium oxide was fed by hot cutting to the central portion of a high-density polyethylene screw cap shell having a diameter of 33 mm, and a disc of a hygroscopic low-density polyethylene resin blended with 50% by weight of sodium pyrophosphate and punched into a diameter of 20 mm was placed thereon followed immediately by pressing by using a press mold to accomplish the molding in a predetermined shape.

The method of production was the same as the method shown in FIG. 4.

B. Evaluation of Container Closures

The container closures were wrap-seamed onto glass bottles containing 50 g of silica gel with torques of 2 kgf-cm and 6 kgf-cm, and the water absorption rates of silica gel were measured in an environment of 23° C. 79%.

Table 5 shows the results of testing. With the container closure produced by using the hygroscopic resin only, an increase in the surface hardness results in the drop of bottle mouth-sealing property despite a large area of the hygroscopic portion, and the water vapor easily infiltrates into the bottle.

With the container closure of the present invention, on the other hand, the water vapor infiltrates little from the external side of the container, and the liner containing hygroscopic agent exhibits hygroscopic effect to a sufficient degree for the content.

TABLE 5

| | Hygroscopic rate of silica gel | |
|---|---|---|
| Wrap-seaming torque | 2 kgf-cm | 6 kgf-cm |
| Container closure | | |
| Comparison product | 1.414% | 0.946% |
| Product of the invention | 0.315% | 0.073% |

(Example 7)

A. Preparation of Container Closures 0.3 g of a low-density polyethylene resin blended with 0.1 PHR of erucic amide and 0.3 PHR of titanium oxide was fed to the central portion of a pilfer-proof cap shell having a diameter of 28 mm, and a disk of a low-density polyethylene resin blended with active carbon and punched into a diameter of 17 mm was placed thereon followed immediately by pressing by using a press mold in the same manner as that of Example 5 to accomplish the molding in a predetermined shape.

B. Evaluation of Container Closures

A glass bottle of a capacity of 100 ml was filled with a medicinal drinking liquid containing garlic extract at a liquid temperature of 65° C., wrap-seamed with the above container closure and was subjected to the heat treatment at 80° C. for 30 minutes. The bottle was preserved under the lying condition a whole day in a reduced pressure tank of 20 mmHg to examine the leakage of liquid. Table 6 shows the results inclusive of the results of the container closure having a liner made of a material of the same composition as that of the disc which is a product for comparison.

TABLE 6

| | Leakage rate |
|---|---|
| Comparison product | 70% |
| Product of the invention | 0 |

We claim:

1. A container closure with a liner comprising a container closure shell and a liner of resin applied to an inner surface of said shell, wherein the liner of resin comprises (i) an upper layer portion which forms a panel, (ii) a lower layer portion which is interposed between said upper layer portion and the shell to join them together and (iii) an outer peripheral portion which forms a hermetically sealing portion, said upper layer portion (i) comprises a resin composition (A) containing additives selected from the group consisting of an oxygen absorbing agent, a drying agent, a deodorant, an antibacterial agent and a thermal color agent, and said lower layer portion (ii) and said outer peripheral portion (iii) are integrally formed and comprise a thermoplastic resin (B) with a cushioning property and elasticity and being free of said additives, said liner being formed by press-molding a molten mass of resin (B) and placing the panel of resin composition (A) onto the molten mass in the container closure shell.

2. A container closure with liner according to claim 1, wherein a fine roughness is formed on the surface of said panel portion at the side of the container.

3. A container closure with a liner according to claim 1, wherein said hermetically sealing portion and said lower layer portion comprise a blend of a low-density polyethylene with at least one of (a) an ethylene-propylene copolymer and (b) a thermoplastic elastomer in an amount of 3 to 40% by weight.

4. A container closure with a liner according to claim 1, wherein said panel portion is provided with a thin coating layer for preventing the elution of said additives.

* * * * *